United States Patent
Beguin

[11] 3,716,856
[45] Feb. 13, 1973

[54] POLARIZATION ADAPTIVE MTI RADAR TRANSPONDER

[75] Inventor: Daniel Edmond Beguin, Saint-Prix, France

[73] Assignee: International Standard Electric Corporation, New York, N.Y.

[22] Filed: Oct. 6, 1971

[21] Appl. No.: 186,899

[30] Foreign Application Priority Data

Oct. 8, 1970 France..........................7036372

[52] U.S. Cl............343/6.8 LC, 343/17.7, 343/18 D, 343/100 PE
[51] Int. Cl..............................................G01s 9/56
[58] Field of Search.........343/6.8 R, 6.8 LC, 17.2 R, 343/17.7, 18 D, 18 E, 100 PE

[56] References Cited

UNITED STATES PATENTS

| 2,683,855 | 7/1954 | Blitz....................................343/17.7 |
| 3,146,447 | 8/1964 | Newman..........................343/100 PE |
| 3,331,070 | 7/1967 | Sommers et al. ..................343/6.8 R |

Primary Examiner—Stephen C. Bentley
Attorney—C. Cornell, Jr.

[57] ABSTRACT

A transponder beacon for use with a coherent pulse-Doppler radar. The transponder antenna system includes a pair of separately, mutually orthogonally polarized antenna channels. Interrogation pulses are analyzed as to polarization and the polarization of the replies is appropriately automatically determined therefrom. Doppler modulation is added to reply pulses for operation with MTI interrogating radars.

7 Claims, 5 Drawing Figures

Inventor
Daniel E. Beguin

By William T. O'Neil
Agent

Inventor
Daniel E. Beguin

POLARIZATION ADAPTIVE MTI RADAR TRANSPONDER

BACKGROUND OF THE INVENTION

1. Field of the Invention

The present invention relates to transponder beacons used in conjunction with coherent pulse Doppler radar.

2. Description of the Prior Art

Mobile ground surveillance radar equipment frequently requires fixed referencing or re-referencing of its geographic position with more or less precision depending on its assigned mission. Detection of fast moving targets such as low-flying aircraft requires less precision than detection of slow targets like pedestrians or ground vehicles, since these may relate to ground tactical situations. The radar antenna position may be determined by using transponder beacons located at known coordinate points, and relying on triangulation to fix the mobile radar's own position.

In coherent pulse Doppler radar systems, means are provided for eliminating fixed targets, therefore transponder beacons used as fixed terrestrial reference points must appear as moving targets. For that purpose, the said transponder beacons are designed so as to vary the received wave phase. Such beacons are, for example, made with a passive reflector to which a phase shifting circuit is associated to process the received wave so as to cause phase modulation at a Doppler frequency to appear in radar reception of returned wave. The phase shift produced by the phase shifting circuit varies, for example, linearly with time like a saw tooth whose repetition rate determines the Doppler frequency which must be detected for the said beacon.

The electric field radiated by the radar antenna may be oriented in different directions corresponding to different polarizations. It is said that an antenna has a vertical polarization when the plane containing the line of wave propagation and the electric field vector is a vertical plane.

An antenna designed for radiating with a predetermined polarization can only receive electro-magnetic signals having the same polarization without resulting attenuation. Consequently, when using a transponder beacon, as described, polarization of the interrogating radar must be considered. In certain radars, polarization changes may be effected during the course of operation so that the transponder beacon is no longer matched, for example, when the radar operation mode is changed from linear polarization to circular polarization for suppressing rain echoes.

SUMMARY OF THE INVENTION

In consideration of the problem outlined, it may be said that the general object of the present invention was to provide a transponder beacon for coherent pulse Doppler radar which is operable in multiple polarization conditions.

According to the invention, a transponder beacon for coherent pulse Doppler radar comprises an antenna made of two radiating source arrays capable to radiate electromagnetic waves having polarization perpendicular to each other, four directional couplers mounted two by two at the output of each array, two detection, amplification and threshold circuits associated each to a directional coupler of each array, a hybrid junction connected to the two other directional couplers, two detection, amplification and threshold circuits mounted at outputs of the hybrid junction, a logic circuit receiving output signals from said detection, amplification and threshold circuits, two microwave phase shifting circuits respectively mounted at the array outputs, and a control circuit for controlling the phase shifting circuits and causing the phase shifts produced by the phase shifting circuits to vary linearly.

Other objects, features and advantages of the present invention will appear from the following description of a specific embodiment, the said description being made in conjunction with the attached drawings, wherein:

DESCRIPTION OF THE PREFERRED EMBODIMENT

Before proceeding with the description of the present invention, the operation of electromagnetic detection systems (radar) for detecting moving targets among fixed targets (MTI) by utilization of Doppler effect will be reviewed briefly. In pulsed radar systems, variations of the phase shift between transmitted and received waves from one repetition period to the next, occur as waves are returned after reflection from moving targets. If, during each repetition period, the transmitted wave phase is stored, it may then be compared with the returned wave phase. From one repetition period to the next, that phase difference or shift is constant for waves returned by fixed targets while it varies linearly with time for waves returned by moving targets which have constant radial velocity greater than zero relative to the antenna. A reference signal (coho) normally preserves the phase of the transmitted pulse during each repetition period. A phase discriminator performing the comparison between that reference and the signal returned by either a fixed target or a moving target produces constant amplitude outputs corresponding to fixed targets pulses and for signals returned by moving targets pulses output signals whose amplitudes vary sinusoidally at a rate $fd$, usually called Doppler frequency. This Doppler modulation is related to the radial velocity v and to the radar wave length $\lambda$ by the equation $fd = 2v/\lambda$.

Figure 1:
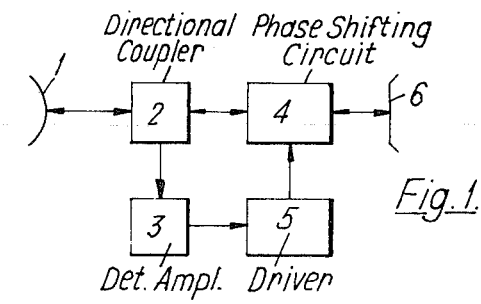
FIG. 1 illustrates a block diagram of a conventional prior art transponder beacon.

Known transponder beacons of the type shown at FIG. 1 comprise an antenna 1 and a directional coupler 2, which applies a small portion of the received energy to the circuit 3 for detection and amplification. A phase shifting circuit 4 is electronically controlled and has R.F. terminals short-circuited by a short-circuit 6 to reflect incident waves. A driver 5 applies a signal to control the phase shifting circuit 4. As previously mentioned, the phase shift of waves returned after reflection from a moving target varies linearly with time. Consequently, in order to cause apparent motion of the beacon at a constant velocity, the phase shift produced by the phase shifting circuit 4 must vary linearly with time. Thus, the signal delivered by the generator 5 will be a saw tooth signal causing the phase shift to vary linearly between 0 and $\pi$ radians. The saw tooth repetition rate will then be the Doppler frequency which is predetermined and assigned to this beacon. It will be noted discrete Doppler beacon frequency assignment acts as a code, making it possible to identify the beacon. It will also be noted that, due to the presence of the R.F. short-circuit 6, the received signal passes through the phase shifting circuit 4 twice, which halves the maximum phase shift of 2 $\pi$ radians required of the phase shifting circuit 4.

The driver operates only if the output signal from the circuit 3 is higher than a threshold incorporated into 3, i.e., if the beacon is receiving pulses which correspond to certain predetermined characteristics. Such an operation mode has the effect of limiting the electric power consumption and thereby enhances the unattended life expectancy of the beacon.

Figure 2:
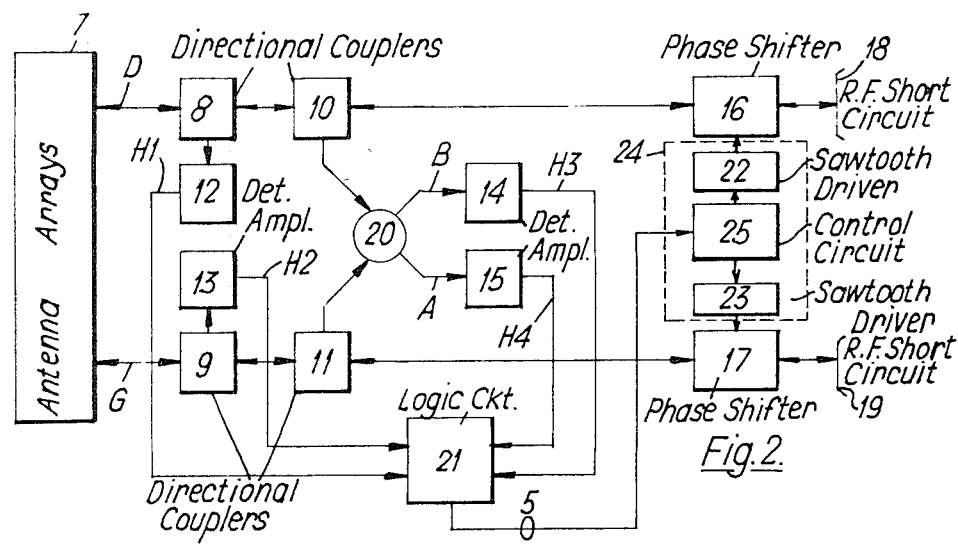
FIG. 2 illustrates the block diagram of a transponder beacon according to the invention.

FIG. 2 shows a block diagram of a transponder beacon according to the features of the present invention. Such a beacon comprises a planar antenna 7 comprising two imbricated arrays of radiating sources, four directional couplers 8, 9, 10 and 11 equivalent to the directional coupler 2 of FIG. 1. Four circuits 12, 13, 14 and 15 equivalent to the circuit 3 of the FIG. 1, a hybrid junction 20 and two phase shifting circuits 15 and 17 whose terminals are respectively short-circuited by the short-circuits 18 and 19, the said phase shifting circuits 16 and 17 being equivalent to the circuit 4 of the FIG. 1, are also provided. A logic circuit 21, two saw tooth voltage generators 22 and 23 equivalent to the generator 5 of the FIG. 1, and a control circuit 25 for controlling the said generators 22 and 23 will be observed.

Figure 3:
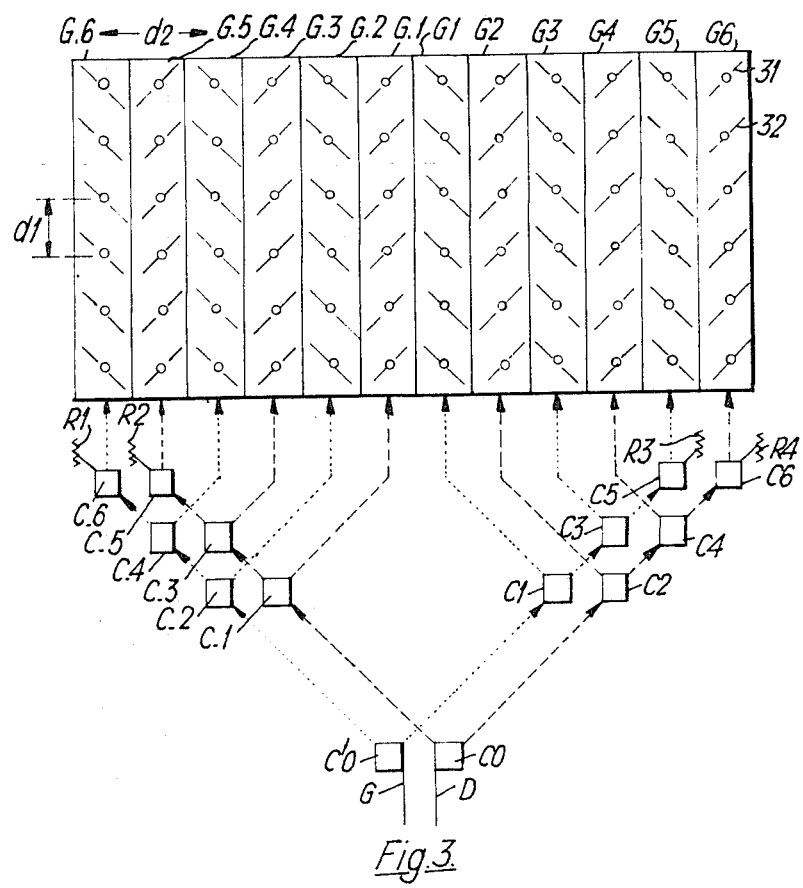
FIG. 3 shows a preferred embodiment of the beacon antenna.

The antenna 7 is made of two imbricated arrays of radiating sources, the said arrays each being capable of radiating linear polarization energy in mutually orthogonal phases, for example, at 45° on either side of the vertical. FIG. 3 illustrates a specific embodiment of the antenna 7 of FIG. 2. It comprises a series of juxtaposed wave guides G1 to G6 and G-1 to G-6, each wave guide comprising radiating elements consisting, for example, in dipoles or slots such as those bearing the references 31 and 32 on the wave guide G6. The individual radiating elements on a wave guide are designed so as to radiate electric fields having their linear polarization in one predetermined orientation. Moreover, electric fields radiated by adjacent wave guides will be seen to be in linear polarizations perpendicular to each other. The feed circuit for those wave guides comprises a series of couplers CO, C'O, C1 to C6 and C-1 to C-6. The elements R1 through R4 are matched loads. The terminal G of the coupler C' corresponds to an array having a polarization direction which forms an arbitrary angle of −45° from the vertical on the left side thereof, and the terminal D of the coupler CO corresponds to the array exhibiting a polarization orientation of +45° (on the right side thereof). Those two terminals G and D are the same as those so labelled in FIG. 2.

When in-phase signals are applied to the terminals G and D, the electric field radiated by the antenna has a vertical polarization since it results from combination, for each pair of adjacent dipoles located in a given horizontal line, of two in-phase perpendicular vectors.

When signals in phase opposition are applied to the terminals G and D, the electric field radiated by the antenna exhibits horizontal polarization. Similarly, when 90° phase related signals are applied to the terminals G and D, the electric field radiated by the antenna exhibits circular polarization which may be left- or right-oriented depending on the sign of the phase shift between the said signals. Reciprocally, when the antenna is receiving, for example, a vertical polarization electromagnetic signal, in-phase signals are produced on each of the terminals G and D. Likewise, when the signal received by the antenna is in horizontal polarization, signals in phase opposition are produced on terminals G and D. When the received signal is circularly polarized, 90° phase shifted signals are produced on those terminals.

A hybrid junction 20 is used which is able to provide, respectively to its outputs A and B, signals in-phase or out-of-phase with respect to the input signals. Thus, if the input signals are in-phase, only the output A provides a signal. On the contrary, if the input signal phases are opposed, only the output B provides a signal. When input signal phase shift is of 90°, both the outputs provide output signals.

The hereunder table shows, for each polarization, the outputs H1, H2, H3 and H4 from the circuits 12–15 which provide a signal higher than a predetermined threshold selected so as to eliminate signals resulting from noise. In this table, "1" corresponds to the presence of a signal and "0" the absence thereof.

| Polarization Types | H1 | H2 | H3 | H4 | Operating Drivers |
|---|---|---|---|---|---|
| +45° polarization | 1 | 0 | 1 | 1 | 22 |
| −45° polarization | 0 | 1 | 1 | 1 | 23 |
| vertical polarization | 1 | 1 | 0 | 1 | 22 and 23 synchronized |
| horizontal polarization | 1 | 1 | 1 | 0 | 22 and 23 synchronized |
| circular polarization | 1 | 1 | 1 | 1 | 22 and 23 shifted |

The logic circuit 21 performs the logic functions according to this truth table on the output signals from H1 through H4. Since there are five such functions, the circuit 21 provides five output leads which are connected to the control circuit 24. The circuit 24 may, by way of example, include two identical saw tooth drivers each associated with a phase shifter, the said drivers being at rest when there is no signal on any of the five output leads of the circuit 21. The hereabove table also shows the drivers which operate depending on the type of received polarization as well as the relative operation phases thereof.

When the polarization is at +45° or −45°, only one of the drivers and one of the shifters operate; that is, according to the initial conventions, the shifter 17 for a polarization at −45°, and the shifter 18 for a polarization at +45°.

When the polarization is vertical or horizontal, both the shifters produce equal phase shift so that the received signal components are retransmitted with the same relative phase, i.e., in-phase for the vertical polarization or in-opposition for the horizontal polarization, as received.

Figure 4:
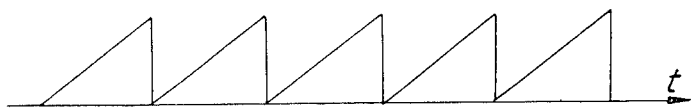
FIGS. 4(a) and 4(b) show the respective time positions of the saw tooth phase shifter driver outputs for the circular polarization case.
Figure 4:
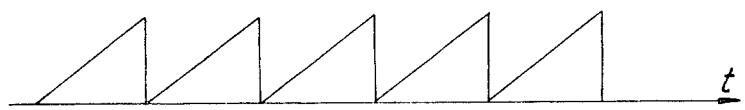

When the polarization is right-oriented or left-oriented circular, both the shifters introduce phase shift of $\pi$ radians. In fact, if the shifters introduce equal shift, the signal transmitted by the beacon would exhibit circular polarization of the same orientation as the received signal. The transmit and receive propagation directions being opposite, the signal received by the radar antenna must have, with respect to the said radar antenna, a reverse circular polarization. The signal transmitted back by the beacon could not otherwise be received by the radar antenna. To properly implement that requirement, it is necessary to reverse the polarization orientation by shifting one of the components by $\pi$ radians with respect to the other one, a condition obtained by shifting the operation time of the saw tooth generators (drivers). The resultant time positions of the saw teeth is shown in the time diagrams of FIGS. 4(a) and 4(b).

While the present invention has been described in relation with specific illustrations, these are intended to be typical and illustrative only and are not intended to limit the scope of the claims hereof.

What is claimed is:

1. A pulse radar transponder adapted for use with coherent pulse Doppler radar interrogating systems, comprising:

first and second substantially mutually orthogonally polarized antenna means;

means connected to each of said first and second antenna means including RF circuit paths terminated in short circuits for reflecting and retransmitting energy received at said first and second antenna means;

electrically controllable phase shift means in series with each of said RF circuit paths;

means responsive to the polarization of received signals from said antenna means for generating signals for controlling said phase shift means, thereby to control the polarization of said replies in a predetermined manner consistent with the polarization of interrogation signals received from said interrogating systems.

2. Apparatus according to claim 1 in which said electrically controllable phase shift means comprises a device which produces a phase shift substantially as a linear analog of the amplitude of said signals for controlling said phase shift means.

3. Apparatus according to claim 2 in which said signals for controlling said phase shift means comprise a pair of repetitive waves of predetermined amplitude as a function of time.

4. Apparatus according to claim 3 in which said repetitive waves are substantially linear slope sawtooth waves.

5. Apparatus according to claim 3 in which said means responsive to the polarization of received signals includes detector circuits for analyzing the relative signal strength in excess of a predetermined threshold at each of said first and second antenna means, to produce signals representative of the signal amplitude received by each corre-sponding one of said first and second antenna means.

6. Apparatus according to claim 5 including driver means responsive to the output of said detector circuits for generating a substantially linear first and second sawtooth waveforms corresponding to and applied to each of said phase shift means, said sawtooth waveforms being generated in time phase so as to control said phase shift means in a manner controlling the polarization of energy reradiated from said first and second antenna means.

7. Apparatus according to claim 6 including a logic circuit responsive to said detector circuits for controlling the operation of said phase shift means whereby only one corresponding phase shifter operates whenever said interrogation signals are linearly polarized corresponding to the polarization of a corresponding one of said antenna means, and both of said phase shift means are operated by said sawtooth control signals in phase relationship producing reradiated circularly polarized energy in a sense receivable by one said interrogating system operating in the circular polarization mode.

* * * * *